(12) United States Patent
Brumley

(10) Patent No.: US 8,385,152 B2
(45) Date of Patent: Feb. 26, 2013

(54) METHOD AND SYSTEM FOR REMOTE SOUND SPEED MEASUREMENT

(75) Inventor: Blair H. Brumley, La Jolla, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 131 days.

(21) Appl. No.: 12/788,035

(22) Filed: May 26, 2010

(65) Prior Publication Data

US 2010/0302907 A1 Dec. 2, 2010

Related U.S. Application Data

(60) Provisional application No. 61/181,573, filed on May 27, 2009.

(51) Int. Cl.
*G01S 15/00* (2006.01)
(52) U.S. Cl. .......................................... 367/89
(58) Field of Classification Search ............ 367/89
See application file for complete search history.

(56) References Cited

U.S. PATENT DOCUMENTS

| | | | |
|---|---|---|---|
| 2,336,053 A | 12/1943 | Athy et al. | |
| 4,210,968 A | 7/1980 | Lindseth | |
| 6,934,217 B2 * | 8/2005 | Dutton et al. ............... | 367/1 |
| 2006/0239122 A1 | 10/2006 | Vigen et al. | |
| 2008/0221449 A1 * | 9/2008 | Sato ............................. | 600/442 |

FOREIGN PATENT DOCUMENTS

| | | |
|---|---|---|
| CA | 823 808 A | 9/1969 |
| GB | 1 363 383 A | 8/1974 |

OTHER PUBLICATIONS

Spiesberger et al. "A New Algorithm for Sound Speed in Seawater." *The Journal of the Acoustical Society for America.* 89(6):2677-2688 (1991).
International Search Report and Written Opinion dated Oct. 28, 2010 for corresponding PCT Application No. PCT/US2010/036244.
The Response to Written Opinion with Demand for Preliminary Examination and Article 34 Amendments filed on Mar. 24, 2011 in corresponding PCT Application No. PCT/US2010/036244.
The International Preliminary Report on Patentability mailed on Jun. 1, 2011 for corresponding PCT Application No. PCT/US2010/036244.
Houston, R.D., "Acoustic Phase Measurements From Volume Scatter in the Ocean", Thesis Submitted in Partial Fulfillment of the Requirements for the Degree of Doctor of Philosophy in the Department of Physics, University of Victoria and Institute of Ocean Sciences, May 1987. 294 pages.

* cited by examiner

*Primary Examiner* — Isam Alsomiri
*Assistant Examiner* — James Hulka
(74) *Attorney, Agent, or Firm* — Knobbe, Martens, Olson & Bear, LLP

(57) ABSTRACT

A system and method of remote sound speed measurement are disclosed. In one embodiment, a system for estimating a sound speed comprises a plurality of transducers configured to i) transmit a first acoustic signal from a first location, ii) transmit a second acoustic signal at a second location, iii) receive a first reflected signal at a third location, and iv) receive a second reflected signal at a fourth location, the reflected signals comprising at least one echo from at least one of the acoustic signals; and a microprocessor configured to i) estimate a travel time based on at least the first or second reflected signals, ii) estimate a travel time difference based on at least the first and second reflected signals, and iii) estimate a sound speed based on at least the estimated travel time and estimated travel time difference.

38 Claims, 11 Drawing Sheets

METHOD AND SYSTEM FOR REMOTE SOUND SPEED MEASUREMENT

CROSS-REFERENCE TO RELATED APPLICATIONS

This application claims the benefit under 35 U.S.C. §119(e) of U.S. Provisional Application No. 61/181,573, filed May 27, 2009, the disclosure of which is herein incorporated by reference in its entirety.

BACKGROUND

1. Field

The disclosed technology relates to sound speed measurement.

2. Description of the Related Technology

The enormous heat capacity of the upper ocean relative to the atmosphere gives it a major role in the regulation of Earth's climate. Monitoring the spatial and temporal variability of heat content of the upper 1000 meters or so of the world's oceans is therefore of great interest. As the temperature and speed of sound are related via well-known formulae, measuring the speed of sound at various points in time and space gives this information.

The speed of sound in water increases with increasing water temperature, increasing salinity, and increasing depth. Most of the change in sound speed in the surface ocean is due to changes in temperature. This is because the effect of salinity on sound speed is small and salinity changes in the open ocean are small. Near shore and in estuaries, where the salinity varies greatly, salinity can have a more significant effect on the speed of sound in water. As the depth increases, the pressure of the water has the largest effect on the speed of sound.

A relation between propagation speed (velocity) as a function of depth, is called the sound speed profile, or sound velocity profile, and it is a fundamental tool for predicting how sound will travel. Neglecting salinity, the sound speed can be obtained from sampling the ambient temperature at various depths. An inexpensive probe to do this is called an expendable bathythermograph (XBT). However, a need exists for other mechanisms, e.g. acoustics mechanisms, for remotely measuring the average speed of sound to a particular depth, or a sound speed profile, to provide the temperature of the water at various points.

SUMMARY OF CERTAIN INVENTIVE ASPECTS

One aspect of the developments is a method of estimating a sound speed, the method comprising transmitting a first acoustic signal from a first location, transmitting a second acoustic signal at a second location, receiving a first reflected signal at a third location, the first reflected signal comprising at least one echo of at least one of the acoustic signals, receiving a second reflected signal at a fourth location, the second reflected signal comprising at least one echo of at least one of the acoustic signals, estimating a travel time based on at least one of the first or second reflected signals, estimating a travel time difference based on at least the first and second reflected signals, and estimating a sound speed based on the estimated travel time and the estimated travel time difference.

Another aspect of the development is a method of estimating a sound speed, the method comprising transmitting an acoustic signal from a first location, receiving a first reflected signal at a second location, the first reflected signal comprising at least one echo of the acoustic signal, receiving a second reflected signal at a third location, the second reflected signal comprising at least one echo of the acoustic signal, receiving a third reflected signal at a fourth location, the third reflected signal comprising at least one echo of the acoustic signal, estimating a travel time based on at least one of the first, second, or third reflected signal, estimating a travel time difference based on at least the first, second, and third reflected signals, and estimating a sound speed based on the estimated travel time and the estimated travel time difference.

Another aspect of the development is a method of estimating a sound speed profile, the method comprising transmitting a first acoustic signal from a first location towards a plurality of reflectors comprising at least a first reflector at a first depth and a second reflector at a second depth, transmitting a second acoustic signal from a second location towards the plurality of reflectors, receiving a first reflected signal at a third location from the plurality of reflectors, receiving a second reflected signal at a fourth location from the plurality of reflectors, estimating at least a first and second travel time based on at least one of the first or second reflected signals, estimating at least a first and second travel time difference based on the first and second reflected signals, estimating the first and second depth, estimating a sound speed to the first and second depths, and estimating a sound speed profile based on the estimated depths and estimated sound speeds.

Yet another aspect of the development is a system for estimating a sound speed, the system comprising a plurality of transducers configured to i) transmit a first acoustic signal from a first location, ii) transmit a second acoustic signal at a second location, iii) receive a first reflected signal at a third location, and iv) receive a second reflected signal at a fourth location, the reflected signals comprising at least one echo from at least one of the acoustic signals; and a microprocessor configured to i) estimate a travel time based on at least the first or second reflected signals, ii) estimate a travel time difference based on at least the first and second reflected signals, and iii) estimate a sound speed based on at least the estimated travel time and estimated travel time difference.

Yet another aspect of the development is a system for estimating a sound speed, the system comprising a plurality of transducers configured to i) transmit a first acoustic signal from a first location, ii) receive a first reflected signal at a second location, iii) receive a second reflected signal at a third location, and iv) receive a third reflected signal at a fourth location, the reflected signals comprising at least one echo from the acoustic signal; and a microprocessor configured to i) estimate a travel time based on at least one of the first, second, or third reflected signals, ii) estimate a travel time difference based on at least the first, second, and third reflected signals, and iii) estimate a sound speed based on at least the estimated travel time and estimated travel time difference.

Another aspect of the development is a system for estimating a sound speed, the system comprising means for transmitting an acoustic signal from a first location, means for receiving a first reflected signal at a second location, the first reflected signal comprising at least one echo of the acoustic signal, means for receiving a second reflected signal at a third location, the second reflected signal comprising at least one echo of the acoustic signal, means for receiving a third reflected signal at a fourth location, the third reflected signal comprising at least one echo of the acoustic signal, means for estimating a travel time based on at least one of the first, second, or third reflected signal, means for estimating a travel time difference based on at least the first, second, and third reflected signals, and means for estimating a sound speed based on the estimated travel time and the estimated travel time difference.

Another aspect of the development is a computer-readable storage medium having instructions encoded thereon which, when executed by a processor, cause a computer to perform a method of estimating a sound speed, the method comprising transmitting a first acoustic signal from a first location, transmitting a second acoustic signal at a second location, receiving a first reflected signal at a third location, the first reflected signal comprising at least one echo of at least one of the acoustic signals, receiving a second reflected signal at a fourth location, the second reflected signal comprising at least one echo of at least one of the acoustic signals, estimating a travel time based on at least one of the first or second reflected signals, estimating a travel time difference based on at least the first and second reflected signals, and estimating a sound speed based on the estimated travel time and the estimated travel time difference.

Another aspect of the development is a computer-readable storage medium having instructions encoded thereon which, when executed by a processor, causes a computer to perform a method of estimating a sound speed, the method comprising transmitting an acoustic signal from a first location, receiving a first reflected signal at a second location, the first reflected signal comprising at least one echo of the acoustic signal, receiving a second reflected signal at a third location, the second reflected signal comprising at least one echo of the acoustic signal, receiving a third reflected signal at a fourth location, the third reflected signal comprising at least one echo of the acoustic signal, estimating a travel time based on at least one of the first, second, or third reflected signal, estimating a travel time difference based on at least the first, second, and third reflected signals, and estimating a sound speed based on the estimated travel time and the estimated travel time difference.

DETAILED DESCRIPTION OF CERTAIN EMBODIMENTS

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1A:
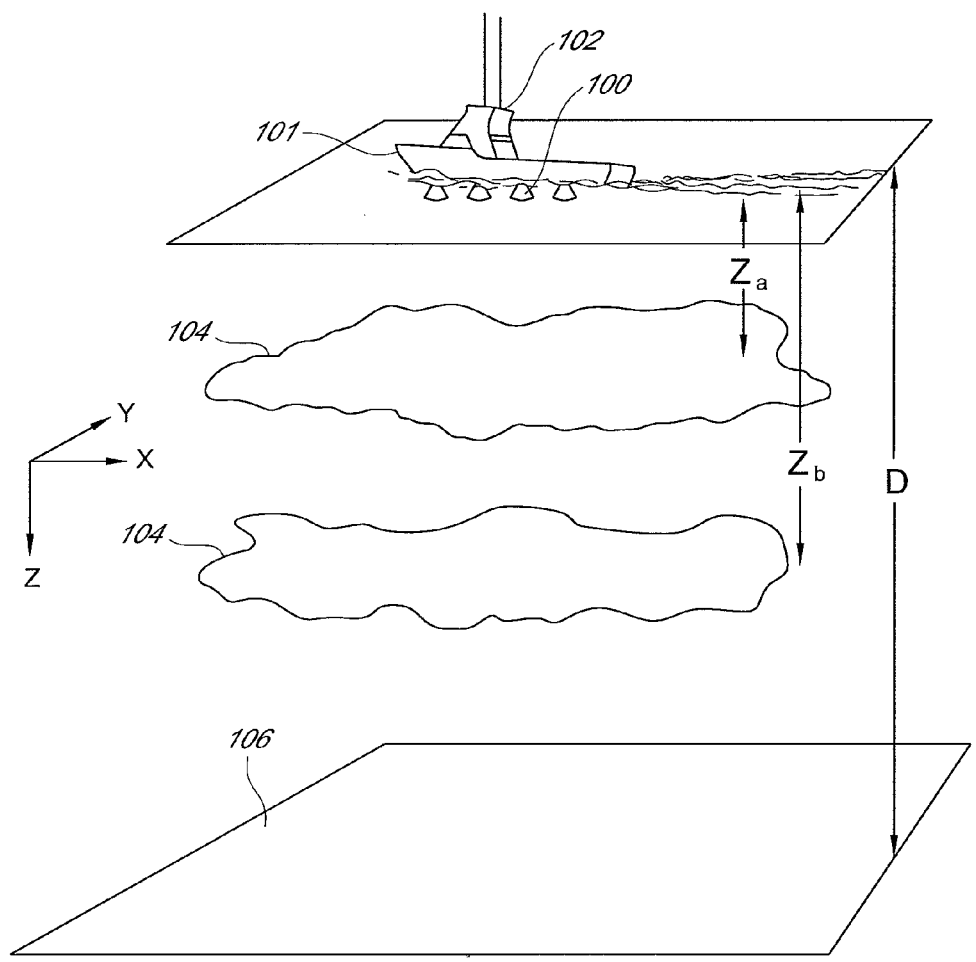
FIG. 1A is perspective view of a download-looking array of transducers attached to the hull of vessel.

FIG. 1A illustrates a transducer array 100 which is attached to the hull of a moving vessel 102. The transducer array 100, as shown in FIG. 1A, generates acoustic beams which emanate from one or more transducers. In the illustrated embodiment, the array 100 is downward-looking, that is, the acoustic beams are directed in a generally vertical orientation towards a scattering layer 104, which may be in the water column or the ocean bottom 106. There may be more than one scattering layer 104 in the water column, each located at different depths. A scattering layer in the water column may include isolated targets, distributed particles, or sound speed inhomogeneities. In particular, the scattering layer may include a life layer, such as a layer of plankton or schooling fish. The scattering layer may include an underwater vehicle, such as submarine or AUV (autonomous underwater vehicle). The scattering layer may include reflective plates or buoys dangled from the vessel 102 for the purposes of acoustic sound speed measurement. The scattering layer may include sound speed change strong enough to reflect (or refract) sound according to Snell's Law. For example, the scattering layer may include a thermocline.

One way of measuring acoustic sound speed using scattering layers is described as follows. An acoustic pulse is transmitted by the transducer array 100, reflected by the scattering layer 104, and received by the transducer array 100. If the distance to the scattering layer, z, is known in advance, the travel time (e.g. the time between transmission and reception), denoted t, can be measured, and the average speed of sound between the vessel 102 and the scattering layer 104 can be calculated by the following formula:

$$c = \frac{t}{2z} \quad (1)$$

If the distance to the scattering layer is not known in advance, in one embodiment, the array 100 is sensitive enough to measure the curvature of the returning wavefront. By measuring the curvature of the wavefront, the distance, z, can be estimated and the formula above can be applied to estimate the sound speed.

One way to measure the wavefront curvature is by taking the second difference of the travel time to each of three or four receivers that are equally spaced along the hull 101 of the vessel 102. This second difference can be regarded as the difference of two first differences, where each of the first differences is a measure of the arriving angle of the sound ray. Calculation of the radius of curvature is therefore equivalent to triangulating back to the scattering layer using the two angles of arrival calculated from two pairs of receivers. The two angles of arrival could be alternatively measured, e.g., by two widely separated arrays, or by correlating returns from each of two pairs of receivers (or pairs of arrays). The wavefront curvature could also be estimated using acoustic tomography, modeling, matched filtering, or wavefront beamforming.

Figure 1B:
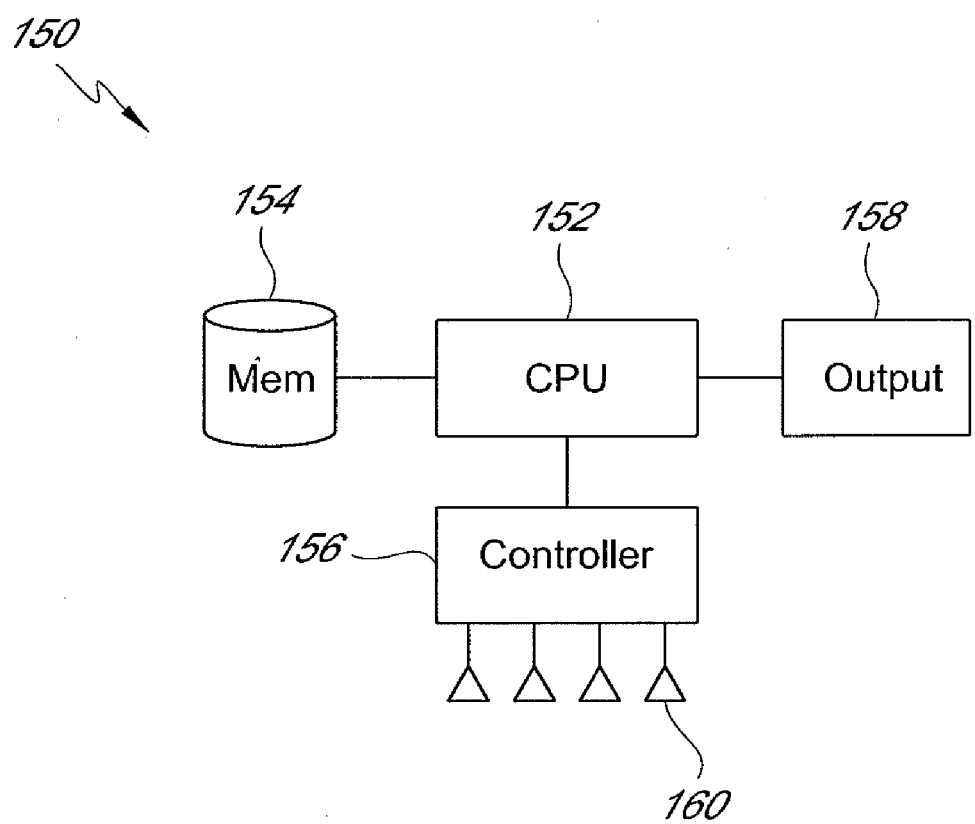
FIG. 1B is a block diagram of a transducer system.

FIG. 1B is a block diagram of a transducer system. The system 150 includes a processor 152, memory 154, and an output 158. The system further includes a controller 156 provided to one or more transducers 160. The processor can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium, such as the memory 154 of FIG. 1B. The memory can be a volatile or non volatile memory such as a DRAM memory, flash memory, ROM memory, EPROM memory, EEPROM memory, registers, hard disk, a removable disk, a CD-ROM, or any other form of suitable storage medium known in the art. An exemplary storage medium is coupled to the processor such the processor can read information from, and write information to, the storage medium. In the alternative, the storage medium may be integral to the processor. The processor and the storage medium may reside in an ASIC or in any suitable commercially available chip set.

The one or more transducers 160 can include hydrophones, projectors, transmitters, and receivers. The one or more transducers 160 may include an array or a beamforming array. In any of the embodiments described below, one or more of the transducers can be replaced by a beamforming array.

Figure 2A:
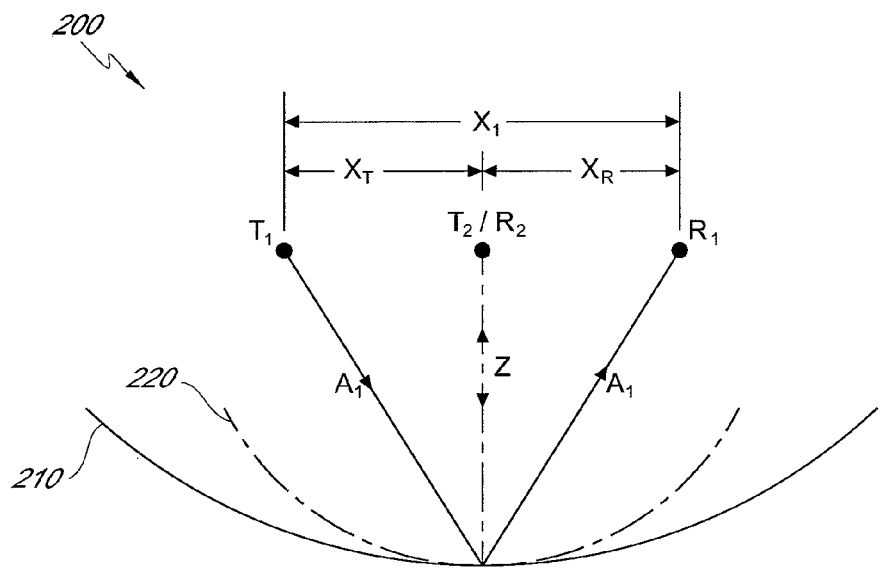
FIG. 2A is a diagram of a symmetric system of three transducers for measuring the sound speed to a particular depth, according to one embodiment of the invention.

FIG. 2A is a diagram of a symmetric system of three transducers for measuring the sound speed to a particular depth, according to one embodiment of the invention. Embodiments of the system may rely on the bistatic invariance principle, also known as "waveform invariance," which is also an element of a Correlation Velocity Log/Profiler (CVL). By that principle, there is a high correlation among identical signals scattered with bistatic geometries sharing the same angle bisector between the incoming and scattered acoustic rays.

The system 200 includes a first transmitter ($T_1$) and a first receiver ($R_1$), separated by a distance $x_1$. An ellipsoid having the first transmitter ($T_1$) and first receiver ($R_1$) as foci is shown in FIG. 2A as a solid curve 210. As an ellipsoid is the locus of points such that the sum of the distances to two fixed points is a constant, the solid curve 210 represents the locus of points at which a reflected pulse transmitted from the first transmitter ($T_1$) would be received at the first receiver ($R_1$) after travel time $t_1$. The system 200 also includes a second transmitter ($T_2$) and a second receiver ($R_2$), which are collocated. In some embodiments, the second transmitter ($T_2$) and second receiver ($R_2$) are a single transducer. In the illustrated embodiment, the distance between the first transmitter ($T_1$) and the second transmitter ($T_2$), denoted $x_T$, is the same as the distance between the first receiver ($R_1$) and the second receiver ($R_2$), denoted $x_R$. In other embodiments, such as the embodiment illustrated in FIG. 2B, these distances may be different. A sphere having the location of the second transmitter ($T_2$) and second receiver ($R_2$) as a center is shown in FIG. 2A as a dashed curve 220. The dashed curve 220 represents the locus of points at which a reflected pulse transmitted from the second transmitter ($T_2$) would be received at the second receiver ($R_2$) after travel time $t_2$. It is to be understood that owing to the effects of refraction, the shape of the locus indicated by curve 210 will only approximate an ellipsoid and that indicated by curve 220 will only approximate a sphere.

The solid curve 210 and dashed curve 220 are tangent to each other at a depth $z_1$ from the transducers. The relative phase relationship of a scattering layer at this depth with the system 200 is approximately the same for both acoustic paths from the first and second transmitter to the scattering layer to the first and second receiver. Therefore, signals received at the two receivers, such as the transducers 160 of FIG. 1B, are highly correlated near the lag where the curves touch, and the cross-correlation yields a relative phase measurement that accurately indicates the difference in travel time between the two acoustic paths. Note that, in some cases, both receivers 160 receive signals from both projectors, but only one signal in each correlates well: the paths that satisfy the requirements of the bistatic invariance principle. Therefore, correlation may only be 50% or less with this scheme. If the positions of the transducers are known, e.g., the distances $x_1$, $x_T$, and $x_R$, the sound speed and depth can be estimated from the travel time difference, denoted $\Delta t$, and an estimate of travel time, $t_0$. In one embodiment, this estimation is performed by a processor, such as the processor 152 of FIG. 1B.

As mentioned above, in some case, the correlation may only be 50% or less. For example, in one embodiment, a 45% correlation would be a reasonable expectation. It is to be appreciated the issue of low correlation is one of degree. Even if a particular system provide a low correlation, such a system can still be used to provide improved measurements if the user is willing to wait long enough for the short-term error to average out.

As described more fully below, there are a number of approached to mitigate problems caused by low correlation. In one embodiment, a receiver array is used to receive signals, wherein the receiver array suppresses interfering signals. For example, in one embodiment, beamforming is employed at the receiver or transmitter.

In one embodiment, different orthogonal codes, alternating pulses, or waveforms with different frequencies can be transmitted by different receivers. In one embodiment, two different receivers alternatively transmit pulses at different times. In one embodiment, the spacing between the pulses is sufficient to allow enough time between scattering from the scattering volume 104 for the two paths to allow the bistatic beam geometry to suppress the unwanted pulse, but to make the measurements with the order reversed at an equal spacing so that linear phase changes due to movement during the interval would cancel out. In one embodiment, transmissions alternate between the first transmitter ($T_1$) and the second transmitter ($T_2$) at about the same interval. In one embodiment, time between a transmission by the first transmitter ($T_1$) and the second transmitter ($T_2$) is different than the time between a transmission by the second transmitter ($T_2$) and the first transmitter ($T_2$). For example, the times can be adjusted based on the differential travel time such that the intervals are equal at the times of scattering.

In one embodiment, two transmitters transmit at different frequencies. In one embodiment, the difference in the frequencies is matched to a fringe spacing to prevent decorrelation over the vertical extent of the averaging volume. For a symmetric geometry, such as that of FIG. 2A, the ratio of the frequencies may be the ratio of the cosines of the angles of the paths to the vertical. Different compensations could be used for different depths and different transmissions.

The inverse of the travel time difference is proportional to the average speed of sound, c, as illustrated in the following formula:

$$\frac{1}{\Delta t} = \frac{c}{2(A_1 - z)} \quad (2)$$

The travel time, $t_0$, can be as estimated as the time between transmission by the first transmitter ($T_1$) and reception by the first receiver ($R_1$), as the time between transmission by the second transmitter ($T_2$) and reception by the second receiver ($R_2$), as the average of these measurements, or by other methods. The travel time, $t_0$, as measured by the average of the times between transmission and reception, is inversely proportional to the average speed of sound, c, as illustrated in the following formula:

$$t_0 = \frac{A_1 + z}{c} \quad (3)$$

The geometric mean of these two measurements is independent of sound speed, and can serve as an estimate of the depth between the transducers and the reflective surface, as shown in the following formula:

$$\sqrt{\frac{t_0}{\Delta t}} = \sqrt{\frac{(A_1 + z)}{2(A_1 - z)}} \quad (4)$$

In particular, one measurement of the depth, derived with an application of Pythagoras's Theorem, may be the vertical distance z, as follows:

$$z = \frac{1}{\sqrt{2}} x_T \left( \sqrt{\frac{t_0}{\Delta t}} - \frac{1}{2}\sqrt{\frac{\Delta t}{t_0}} \right) = \frac{x_T t_2}{\sqrt{2 \Delta t \cdot t_0}} \quad (5)$$

The square root of the ratio of the two measurements (Eqns. 2 and 3) can serve as a measure of the average sound speed between the transducers and the reflective surface, as shown in the following formula:

$$\frac{1}{\sqrt{\Delta t \cdot t_0}} = \frac{c}{\sqrt{2(A_1^2 - z^2)}} \quad (6)$$

In particular, one measurement of the sound speed, also derived via geometry, may be as follows:

$$c = x_T \sqrt{\frac{2}{\Delta t \cdot t_0}} \quad (7a)$$

Refractive effects, tilt, and platform motion can also be corrected for. For certain applications, the depth-averaged sound speed (or reciprocal sound speed) to a particular depth z is the desired measurement, in which case Eqn. 7a can be used directly. Neglecting refractive effects, the sound speed c in that equation is the reciprocal of the average (over the water column down to the scattering layer) of the reciprocal sound speed.

In other applications, a remote portion of the vertical profile of sound speed (or reciprocal sound speed) is the desired measurement. The sound speed profile can be measured by averaging (over a number of pings) the depth measurement z from Eqn. 5 (or a similar algorithm correcting for the effects mentioned in the previous paragraph) as a function of the vertical-path travel time $t_2$, then approximating the derivative of this function as the ratio of differences in z to differences in $t_2$ over finite layers of water. To be precise, the ratio $2\Delta z/\Delta t_2$ for a particular layer (e.g., the layer between $z_1$ and $z_2$ in FIG. 1A) is the reciprocal of the mean reciprocal sound speed over that layer:

$$\frac{2\Delta z}{\Delta t_2} = \frac{1}{\frac{1}{\Delta z}\int_z^{z+\Delta z} \frac{1}{c(z)} dz} \cong c(z) \quad (7b)$$

Interpolation or iterative processing may be required if the sound speed profile is desired at a given fixed set of depths.

Figure 2B:
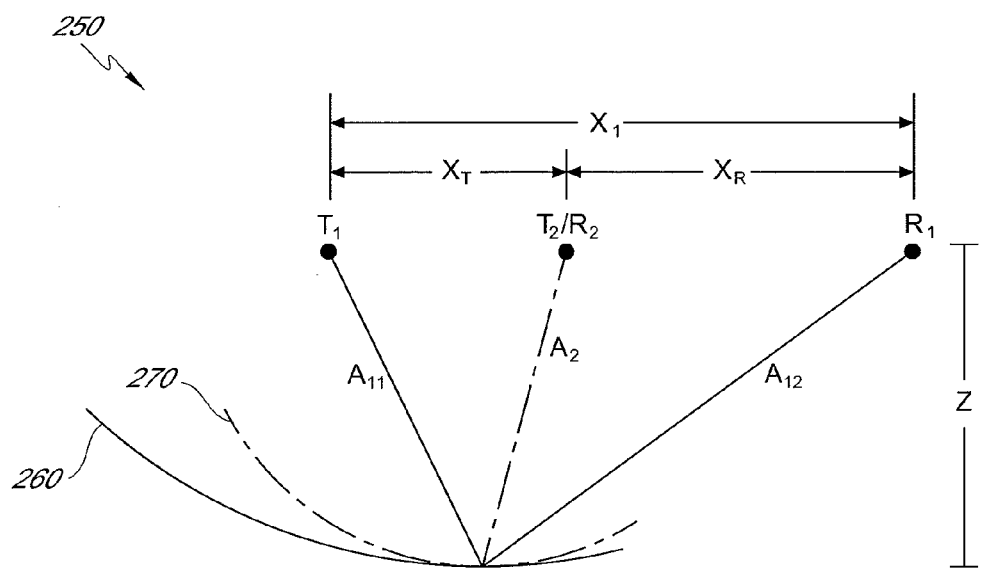
FIG. 2B is a diagram of an asymmetric system of three transducers for measuring the sound speed to a particular depth, according to one embodiment of the invention.

FIG. 2B is a diagram of an asymmetric system of three transducers for measuring the sound speed to a particular depth, according to one embodiment of the invention. Like the system 200 illustrated in FIG. 2A, the system 250 includes a first transmitter ($T_1$) and a first receiver ($R_1$), separated by a distance $x_1$. An ellipsoid having the first transmitter ($T_1$) and first receiver ($R_1$) as foci is shown in FIG. 2B as a solid curve 260. As an ellipsoid is the locus of points such that the sum of the distances to two fixed points is a constant, the solid curve 260 represents the locus of points at which a reflected pulse transmitted from the first transmitter ($T_1$) would be received at the first receiver ($R_1$) after travel time $t_1$. The system 250 also includes a second transmitter ($T_2$) and a second receiver ($R_2$), which are collocated. In some embodiments, the second transmitter ($T_2$) and second receiver ($R_2$) are a single transducer. In the illustrated embodiment, the distance between the first transmitter ($T_1$) and the second transmitter ($T_2$), denoted $x_T$, is different from the distance between the first receiver ($R_1$) and the second receiver ($R_2$), denoted $x_R$. In other embodiments, such as the embodiment illustrated in FIG. 2A, these distances may be same. A sphere having the location of the second transmitter ($T_2$) and second receiver ($R_2$) as a center is shown in FIG. 2B as a dashed curve 270. The dashed curve 270 represents the locus of points at which a reflected pulse transmitted from the second transmitter ($T_2$) would be received at the second receiver ($R_2$) after travel time $t_2$. It is to be understood that owing to the effects of refraction, the shape of the locus indicated by curve 260 will only approximate an ellipsoid and that indicated by curve 270 will only approximate a sphere.

The solid curve 260 and dashed curve 270 are tangent to each other at a depth z from the transducers. The relative phase relationship of a reflective surface at this depth with the system 200 is approximately the same for both acoustic paths from the first and second transmitter to reflective surface to first and second receiver. Therefore, signals received at the two receivers, such as the transducers 160 of FIG. 1B, are highly correlated near the lag where the curves touch, and the cross-correlation yields a relative phase measurement that accurately indicates the difference in travel time between the two acoustic paths. Note that, in some cases, both receivers 160 receive signals from both projectors, but only one signal in each correlates well: the paths that satisfy the requirements of the bistatic invariance principle. Therefore, correlation may only be 50% or less with this scheme. If the positions of the transducers are known, e.g., the distances $x_1$, $x_T$, and $x_R$, the sound speed and depth can be estimated from the travel time difference, denoted $\Delta t$, and an estimate of travel time, $t_0$. In one embodiment, this estimation is performed by a processor, such as the processor 152 of FIG. 1B.

The solid curve 260 and dashed curve 270 are tangent to each other at a depth z from the transducers when the transducer spacing satisfies the following geometrical constraint:

$$\frac{x_R - x_T}{x_T x_R} = \frac{2\sin\alpha}{A_2} = \frac{\sin(2\alpha)}{z} \tag{8}$$

where $\alpha$ represents the angle of the center beam (of length $A_2$) to the vertical.

The inverse of the travel time difference is proportional to the average speed of sound, c, as illustrated in the following formula:

$$\frac{1}{\Delta t} = \frac{c}{(A_{11} + A_{12} - 2A_2)} \tag{9}$$

The travel time, $t_0$, can be as estimated as the time between transmission by the first transmitter ($T_1$) and reception by the first receiver ($R_1$), as the time between transmission by the second transmitter ($T_2$) and reception by the second receiver ($R_2$), as the average of these measurements, or by other methods. The travel time, $t_0$, as measured by the average of the times between transmission and reception, is inversely proportional to the average speed of sound, c, as illustrated in the following formula:

$$t_0 = \frac{1}{2} \frac{A_{11} + A_{12} + 2A_2}{c} \tag{10}$$

The geometric mean of these two measurements (Eqns. 2 and 3) is independent of sound speed, and can serve as a estimate of the depth between the transducers and the reflective surface, as shown in the following formula:

$$\sqrt{\frac{t_0}{\Delta t}} = \sqrt{\frac{(A_{11} + A_{12} + 2A_2)}{2(A_{11} + A_{12} - 2A_2)}} \tag{11}$$

Another estimate of the depth, derived with an application of Pythagoras's Theorem, may be the vertical distance z, as follows:

$$z = \frac{\frac{1}{2}x_1 \cos\alpha}{\sqrt{\frac{t_1^2}{t_2^2} - \frac{x_1^2}{4x_T x_R}}} = \frac{1}{2}x_1 \frac{\sqrt{\frac{t_1^2}{t_2^2} - \left(\frac{x_1^2}{4x_T x_R}\right)^2}}{\left(\frac{t_1^2}{t_2^2} - \frac{x_1^2}{4x_T x_R}\right)}, \tag{12}$$

The square root of the ratio of the two measurements (Eqns. 2 and 3) can serve as an estimate of the average sound speed between the transducers and the reflective surface, as shown in the following formula:

$$\frac{1}{\sqrt{\Delta t \cdot t_0}} = \frac{c}{\sqrt{2((A_{11} + A_{12})^2 - (2A_2)^2)}} \tag{13}$$

Another estimate of the sound speed, also derived via geometry, may be as follows:

$$c = \frac{1}{\sqrt{\frac{t_1^2}{x_1^2} - \frac{t_2^2}{4x_T x_R}}} \tag{14}$$

As discussed above with respect to FIG. 2A, corrections may be applied for refractive effects, tilt, and platform motion which become increasingly important with increasing angle $\alpha$. We can calculate the hypothetical travel time for a vertical beam as $t_v = 2z/c = t_2 \cos\alpha$. The sound speed profile can be found by averaging z as a function of $t_v$ and then differentiating or calculating the differences $\Delta z/\Delta t_v$.

Figure 3A:
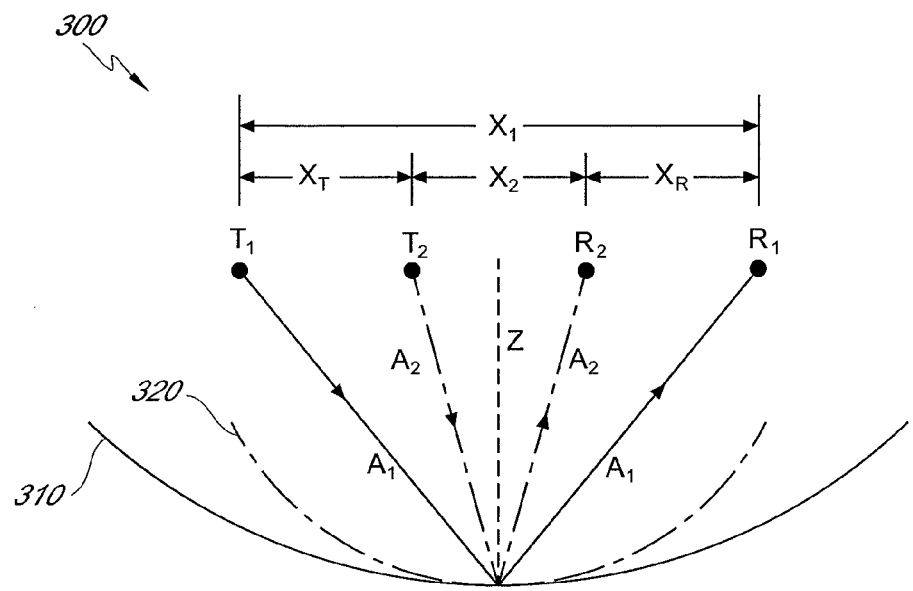
FIG. 3A is a diagram of a symmetric system of four transducers for measuring the sound speed to a particular depth, according to one embodiment of the invention.

FIG. 3A is a diagram of a symmetric system of four transducers for measuring the sound speed to a particular depth, according to one embodiment of the invention. The system 300 includes a first transmitter ($T_1$) and a first receiver ($R_1$) separated by a distance $x_1$, and also a second transmitter ($T_2$) and a second receiver ($R_2$) separated by a distance $x_2$. In the illustrated embodiment, the distance between the first transmitter ($T_1$) and the second transmitter ($T_2$), denoted $x_T$, is the same as the distance between the first receiver ($R_1$) and the second receiver ($R_2$), denoted $x_R$. In other embodiments, such as the embodiment illustrated in FIG. 3B, these distances may be different.

An ellipsoid having the first transmitter ($T_1$) and first receiver ($R_1$) as foci is shown in FIG. 3 as a solid curve 310, and an ellipsoid having the second transmitter ($T_2$) and second receiver ($R_2$) as foci is shown in FIG. 3A as a dashed curve 320. It is to be understood that the loci of points indicated by curves 310 and 320 may differ slightly from ellipsoids owing to refraction.

The solid curve 310 and dashed curve 320 are tangent to each other at a depth z from the transducers. As described with respect to FIG. 2, the relative phase relationship of a reflective surface at this depth will be approximately the same for both acoustic paths from the first and second transmitter to reflective surface to first and second receiver. Therefore, signals received at the two receivers will be highly correlated near the lag where the curves touch, and the cross-correlation will yield a relative phase measurement that accurately indicates the difference in travel time between the two acoustic paths. If the positions of the transducers are known, the sound speed and depth can be estimated from the travel time difference, denoted $\Delta t$, and an estimate of travel time, $t_0$, via any of number of formulas.

The inverse of the travel time difference is proportional to the average speed of sound, c, as illustrated in the following formula:

$$\frac{1}{\Delta t} = \frac{c}{2(A_1 - A_2)} \quad (15)$$

The travel time, $t_0$, can be as measured as the time between transmission by the first transmitter ($T_1$) and reception by the first receiver ($R_1$), as the time between transmission by the second transmitter ($T_2$) and reception by the second receiver ($R_2$), as the average of these measurements, or by other methods. The travel time, $t_0$, as measured by the average of the times between transmission and reception, is inversely proportional to the average speed of sound, c, as illustrated in the following formula:

$$t_0 = \frac{A_1 + A_2}{c} \quad (16)$$

The geometric mean of these two measurements is independent of sound speed, and can serve as a measure of a depth between the transducers and the reflective surface. This may be approximated using formula (5) above, or another formula particular to this more generic case. The square root of the ratio of the measurements can be used to estimate the sound speed between the transducers and the reflective surface. This may be approximated using formula (7) above or a different formula.

Through geometry, an estimate of the mean sound speed and an estimate of depth can thus be written as:

$$c = \sqrt{\frac{(x_1 + x_2)x_T}{\Delta t \cdot t_0}} \quad (17)$$

$$z = \frac{1}{2} t_v \sqrt{\frac{(x_1 + x_2)x_T}{\Delta t \cdot t_0}} \quad (18)$$

where the hypothetical vertical-path travel time $t_v$ can be estimated as:

$$t_v = \sqrt{t_2^2 - \frac{x_2^2 \cdot \Delta t \cdot t_0}{(x_1 + x_2)x_T}} \quad (19)$$

Refractive effects, tilt, and platform motion can also be corrected for. In some applications, the reciprocal of the water-column-averaged reciprocal sound speed given by Eqn. 17 (or a corrected version of it) is the desired estimate. In other applications where a remote segment of the sound speed profile is desired, the depth z given by Eqn. 18 as a function of $t_v$ given by Eqn. 19 (or corrected versions of these equations) can be averaged over a number of pings, then differentiated or differenced to estimate the sound speed profile $c(z)=2dz/dt_v \cong 2\Delta z/\Delta t_v$. Interpolation or iterative processing may be required if the sound speed profile is desired at a given fixed set of depths.

Figure 3B:
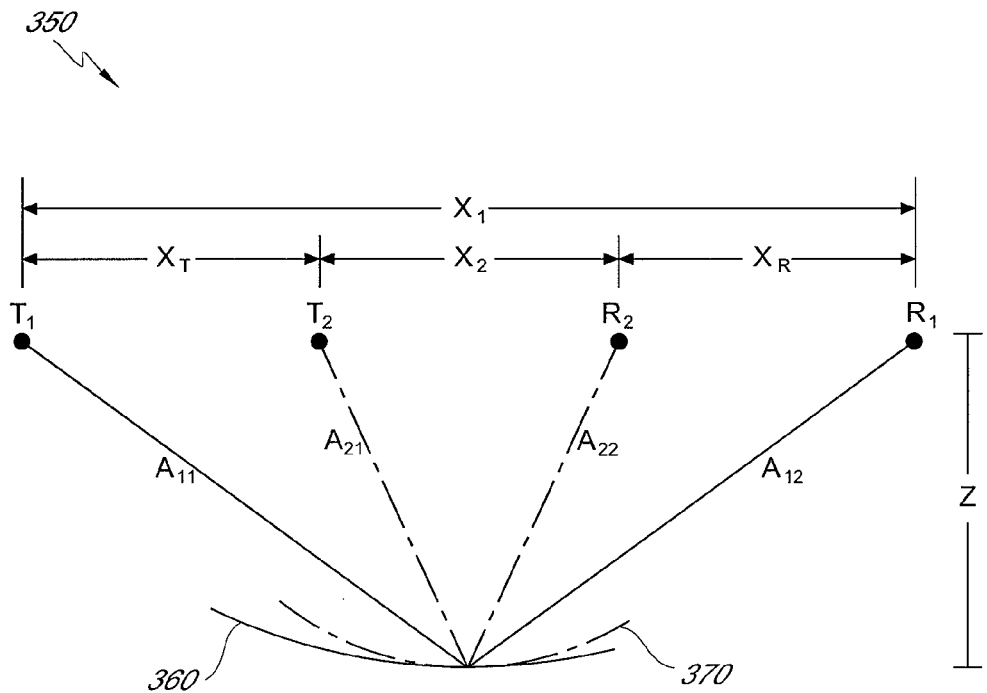
FIG. 3B is a diagram of an asymmetric system of four transducers for measuring the sound speed to a particular depth, according to one embodiment of the invention.

FIG. 3B is a diagram of an asymmetric system of four transducers for measuring the sound speed to a particular depth, according to one embodiment of the invention. The system 350 includes a first transmitter ($T_1$) and a first receiver ($R_1$) separated by a distance $x_1$, and also a second transmitter ($T_2$) and a second receiver ($R_2$) separated by a distance $x_2$. The distance between the first transmitter ($T_1$) and the second transmitter ($T_2$), denoted $x_T$, and the distance between the first receiver ($R_1$) and the second receiver ($R_2$), denoted $x_R$ can be either the same or different.

An ellipsoid having the first transmitter ($T_1$) and first receiver ($R_1$) as foci is shown in FIG. 3B as a solid curve 360, and an ellipsoid having the second transmitter ($T_2$) and second receiver ($R_2$) as foci is shown in FIG. 3B as a dashed curve 370. It is to be understood that the loci of points indicated by curves 360 and 370 may differ slightly from ellipsoids owing to refraction.

The solid curve 360 and dashed curve 370 are tangent to each other at a depth z from the transducers. As described with respect to FIG. 2A, the relative phase relationship of a reflective surface at this depth will be approximately the same for both acoustic paths from the first and second transmitter to reflective surface to first and second receiver. Therefore, signals received at the two receivers will be highly correlated near the lag where the curves touch, and the cross-correlation will yield a relative phase measurement that accurately indicates the difference in travel time between the two acoustic paths. If the positions of the transducers are known, the sound speed and depth can be estimated from the travel time difference, denoted $\Delta t$, and an estimate of travel time, $t_0$, via any of number of formulas.

The inverse of the travel time difference is proportional to the average speed of sound, c, as illustrated in the following formula:

$$\frac{1}{\Delta t} = \frac{c}{(A_{11} + A_{12} - A_{21} - A_{22})} \quad (20)$$

The travel time, $t_0$, can be as measured as the time between transmission by the first transmitter ($T_1$) and reception by the first receiver ($R_1$), as the time between transmission by the second transmitter ($T_2$) and reception by the second receiver ($R_2$), as the average of these measurements, or by other methods. The travel time, $t_0$, as measured by the average of the times between transmission and reception, is inversely proportional to the average speed of sound, c, as illustrated in the following formula:

$$t_0 = \frac{A_{11} + A_{12} + A_{21} + A_{22}}{2c} \quad (21)$$

The geometric mean of these two measurements is independent of sound speed, and can serve as a measure of a depth between the transducers and the reflective surface. This may be approximated using formula (5) above, or another formula particular to this more generic case. The square root of the ratio of the measurements can be used to estimate the sound speed between the transducers and the reflective surface. This may be approximated using formula (7) above or a different formula.

Through geometry, an estimate of the mean sound speed and an estimate of depth can thus be written as:

$$c = \sqrt{\frac{H_2 - H_1}{H_2\left(\frac{t_1}{x_1}\right)^2 - H_1\left(\frac{t_2}{x_2}\right)^2}} \quad (22)$$

$$z = \frac{1}{2}t_v c = \frac{\sqrt{\left(\left(\frac{t_2}{x_2}\right)^2 - \left(\frac{t_1}{x_1}\right)^2\right)\left(G_2\left(\frac{t_1}{x_1}\right)^2 - G_1\left(\frac{t_2}{x_2}\right)^2\right)}}{H_2\left(\frac{t_1}{x_1}\right)^2 - H_1\left(\frac{t_2}{x_2}\right)^2} \quad (23)$$

where the hypothetical vertical-path travel time $t_v$ can be estimated as:

$$t_v = \frac{2z}{c} = 2\sqrt{\frac{\left(\left(\frac{t_2}{x_2}\right)^2 - \left(\frac{t_1}{x_1}\right)^2\right)\left(G_2\left(\frac{t_1}{x_1}\right)^2 - G_1\left(\frac{t_2}{x_2}\right)^2\right)}{(H_2 - H_1)\left(H_2\left(\frac{t_1}{x_1}\right)^2 - H_1\left(\frac{t_2}{x_2}\right)^2\right)}} \quad (24)$$

and the constants $H_1$, $H_2$, $G_1$, and $G_2$ are defined as:

$$H_1 = \frac{1}{x_1^2}\left[2 + \frac{x_T^2 + x_R^2 + x_2(x_T + x_R)}{\sqrt{x_T x_R (x_T x_R + x_1 x_2)}}\right] \quad (25)$$

$$H_2 = \frac{1}{x_2^2}\left[2 + \frac{2x_T x_R + x_2(x_T + x_R)}{\sqrt{x_T x_R (x_T x_R + x_1 x_2)}}\right] \quad (26)$$

$$G_1 = H_1 + \frac{(x_T + x_R)^2}{4x_T x_R (x_T x_R + x_1 x_2)} \quad (27)$$

$$G_2 = H_2 + \frac{(x_T + x_R)^2}{4x_T x_R (x_T x_R + x_1 x_2)} \quad (28)$$

Refractive effects, tilt, and platform motion can also be corrected for. In some applications, the reciprocal of the water-column-averaged reciprocal sound speed given by Eqn. 22 (or a corrected version of it) is the desired estimate. In other applications where a remote segment of the sound speed profile is desired, the depth z given by Eqn. 23 as a function of $t_v$ given by Eqn. 24 (or corrected versions of these equations) can be averaged over a number of pings, then differentiated or differenced to estimate the sound speed profile c(z)=2dz/$dt_v \cong 2z/\Delta t_v$. Interpolation or iterative processing may be required if the sound speed profile is desired at a given fixed set of depths.

Figure 4:
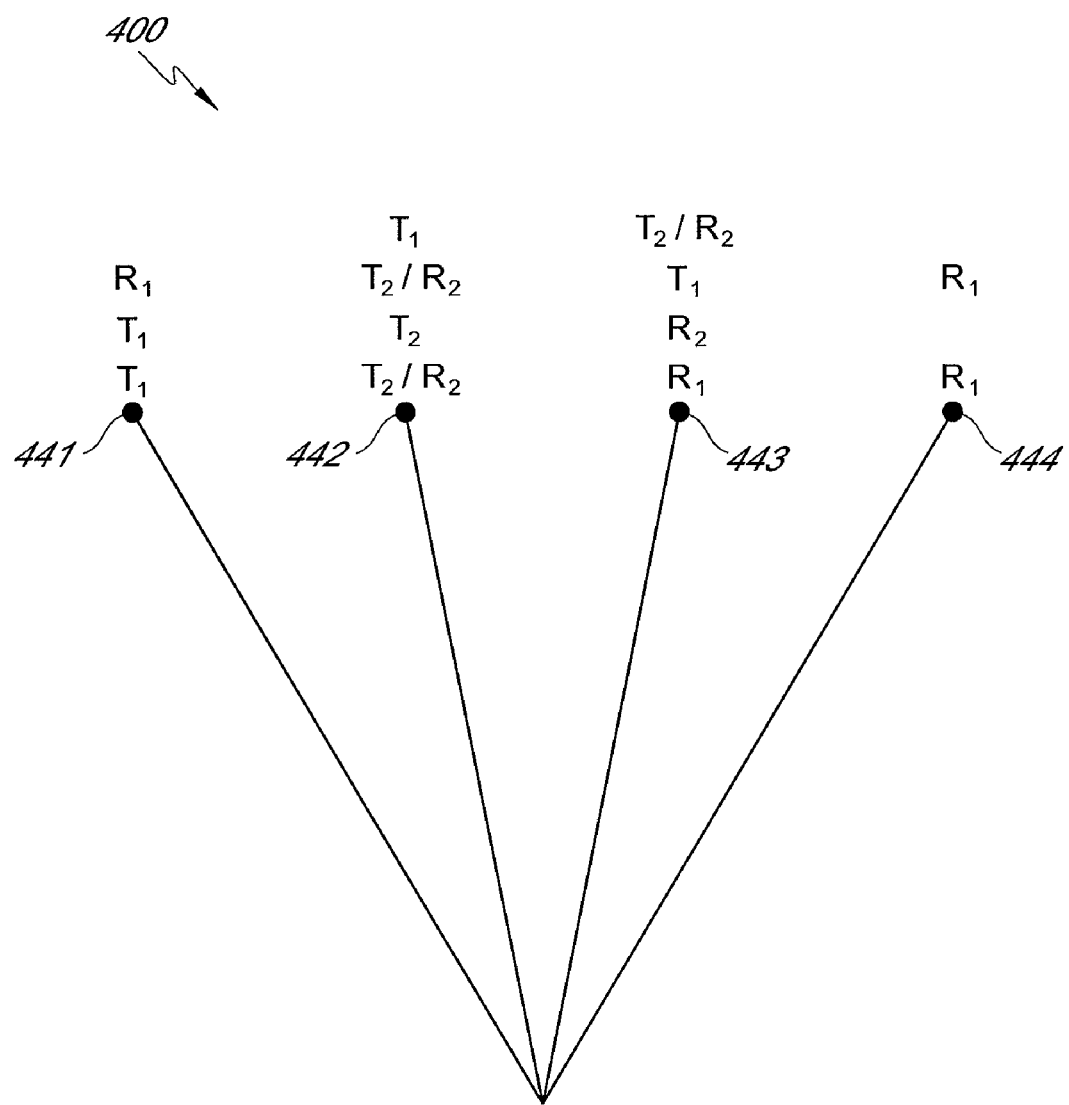
FIG. 4 is a diagram of another system of four transducers for measuring the sound speed to a particular depth, according to one embodiment of the invention.

In many acoustic systems, the cost of a transducer which can both transmit and receive is less than the cost of two transducers, one configured to transmit only, and the other configured to receive only. FIG. 4 is a diagram of another system of four transducers for measuring the sound speed to a particular depth, according to one embodiment of the invention. The system 400 illustrated in FIG. 4 includes four transducers 441, 442, 443, 444 configured for both transmission and reception. As will be appreciated by those skilled in the art, certain configurations discussed below do not require that each transducer be capable of transmitting and receiving. In one embodiment, the transducers are spaced so as to give equal angles between beams at the point where they intersect near the measurement depth. The system 400 can be used in the same manner as the system 300 illustrated in FIG. 3A or the system 350 in FIG. 3B, but can also be simultaneously used akin to the system 200 illustrated in FIG. 2A or the system 250 illustrated in FIG. 2B.

For example, transducers 441, 442, and 443 can be used in the manner of the system 200 illustrated in FIG. 2A, wherein transducer 441 takes the place of $T_1$, 443 takes the place of $R_1$, and 442 takes the place of both $T_2$ and $R_2$. All four transducers 441, 442, 443, 444 can be used in the manner of the system 300 illustrated in FIG. 3A, wherein transducer 441 takes the place of $T_1$, 442 takes the place of $T_2$, 443 takes the place of $R_2$, and 444 takes the place of $R_1$. These two configurations of the system can be used simultaneously, as they share the same transmitters 441 and 442. By comparing signals from two different pairs of receivers, the two independent measurements can be made at once for the purposes of averaging or obtaining additional speed/depth pairs.

In another example shown in FIG. 4, transducers 441, 442, and 443 can be used in the manner of the system 200 illustrated in FIG. 2A, wherein transducer 443 takes the place of $T_1$, 441 takes the place of $R_1$, and 442 takes the place of both $T_2$ and $R_2$. Simultaneously, transducers 442, 443, and 444 can be used in the manner of the system 200 illustrated in FIG. 2A, wherein transducers 442 takes the place of $T_1$, 444 takes the place of $R_1$, and 443 takes the place of both $T_2$ and $R_2$. Because the two sets of transducers share the same pair of transmitters 442 and 443, they can operate independently without interfering with each other, giving two independent measurements of travel time difference. These measurements are affected oppositely by pitch rate, allowing a convenient method for eliminating errors due to pitch rate.

In another example shown in FIG. 4, transducers 442, 443 and 444 can be used in the manner of the system 200 illustrated in FIG. 2A, wherein transducer 442 takes the place of $T_1$, 444 takes the place of $R_1$, and 443 takes the place of both $T_2$ and $R_2$. Simultaneously, transducers 441, 442, 443 and 444 can be used in the manner of the system 300 illustrated in FIG. 3A, wherein transducer 441 takes the place of of $T_1$, 444 takes the place of $R_1$, 442 takes the place of $T_2$, and 443 takes the place of $R_2$. At each receiver, scattered signals received from two of the three transmitters will correlate with two of the three signals at the other receiver. Introduction of small delays between transmissions may be used to get the correlated signals to occur at the same time lag, in which case the correlation coefficient could be as high as ⅔.

In other embodiments, the system 300 of FIG. 3A is emulated wherein 441 takes the place of $R_1$, 442 takes the place of $R_2$, 443 takes the place of $T_2$, and 444 takes the place of $T_1$. In other embodiments, the system 200 of FIG. 2A is emulated wherein 442 takes the place of $R_1$, 444 takes the place of $T_1$, and 443 takes the place of both $T_2$ and $R_2$.

Figure 5A:
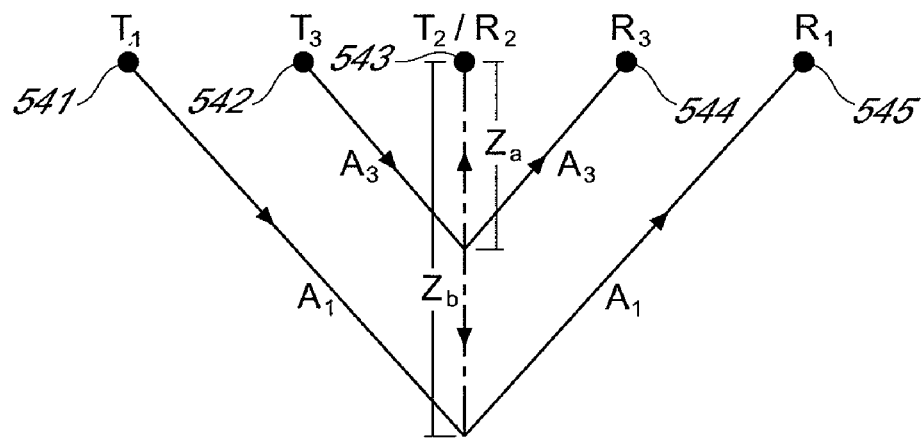
FIG. 5A is a diagram of a system of five transducers for measuring the sound speed to two depths, according to one embodiment of the invention.

In order to estimate a sound speed profile comprising more than one speed, the average sound speed between the transducers of a system to different depths is needed. FIG. 5A is a diagram of a system of five transducers for measuring the sound speed to two depths, according to one embodiment of the invention. The system 500 illustrated in FIG. 5 includes 5 transducers which can be used, three at a time, in the manner of the system 200 of FIG. 2. In particular, transducers 541, 543, and 545 can be used in the manner of system 200 of FIG. 2 to measure a first depth, $z_1$, and the average sound speed, $c_1$, between the transducers and that depth. Transducers 542, 543, and 544 can be used in the manner of system 200 of FIG. 2 to measure a second depth, $z_2$, and the average sound speed, $c_2$, between the transducers and that depth. In the illustrated embodiment, transducer 543 is used for both depths as a transmitter and a receiver. In other embodiments, separate transducers are used for transmitting and receiving. In other embodiments, different transducers, using the same or different frequency bands, can be used in connection with the different depths.

Figure 5B:
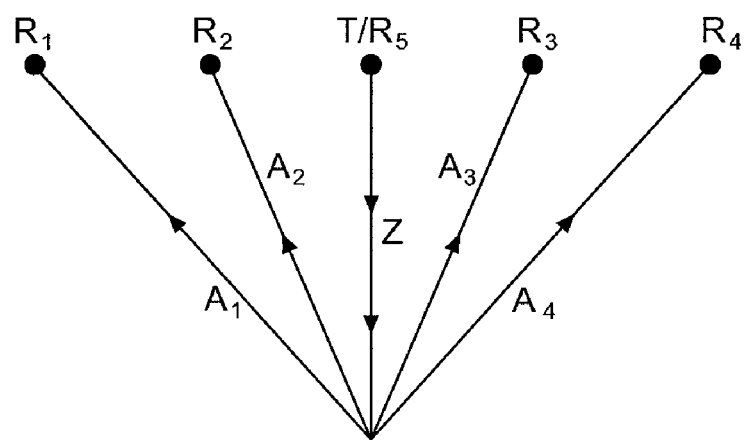
FIG. 5B is a diagram of a system of five transducers for measuring the sound speed to a particular depth, according to one embodiment of the invention.

Although the above described embodiments include systems having more than one transmitter, other embodiments may have only one transmitter. FIG. 5B is a diagram of a system of five transducers for measuring the sound speed to a particular depth, according to one embodiment of the invention. In this embodiment, a single transmitter (T) transmits a pulse which is received by a number of receivers. In one embodiment, the signal is received by four receivers ($R_1$, $R_2$, $R_3$, $R_4$). In one embodiment, only three receivers ($R_2$, $R_5$, $R_3$) are used. One of the receivers ($R_5$) can also be the transmitter (T).

In one mode of operation, the transmitter (T) emits a pulse which is received on four receivers ($R_1$, $R_2$, $R_3$, $R_4$). An estimate of travel time can be derived from one or more of the received signals. For example, an estimate of travel time can be generated from any one of the received signals alone, an estimate of travel time can be generated by averaging estimates generated from the inner path, or an estimate of travel time can be generated by averaging estimates generated from all receivers. A four-fold product of the four received signals, with two of the signals conjugated (for example, those received from $R_1$ and $R_4$ or those received from $R_2$ and $R_3$), can be used to estimate a measure of the difference in path lengths between the sum of the outer paths ($A_1+A_4$) and the sum of the inner paths ($A_2+A_3$), which is an estimate of the travel time difference. The three relative lags at which these four signals are correlated can be adjusted to maximize the correlation coefficient.

In another mode of operation, the transmitter (T) emits a pulse which is received on three receivers ($R_2$, $R_5$, $R_3$). An estimate of travel time can be derived in any of a number of ways, as described above, and an estimate of travel time difference can be generated using a four-fold product of the received signals. Since there are only three received signals in this mode, a four-fold product would require that one of the signals be used twice. For example, the four-fold product can include the signal received at $R_2$, the signal received at $R_5$ conjugated and then squared, and the signal received at $R_3$. The two relative lags at which these three signals are correlated can be adjusted to maximize the correlation coefficient.

Figure 6A:
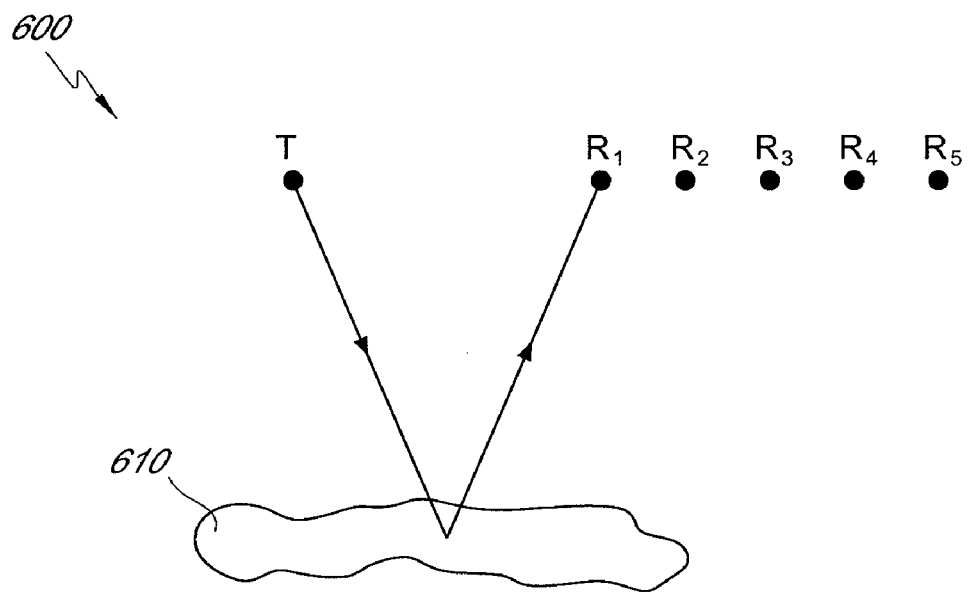
FIG. 6A is a diagram of a system of multiple transducers for measuring the sound speed to a particular depth before motion of the system.
Figure 6B:
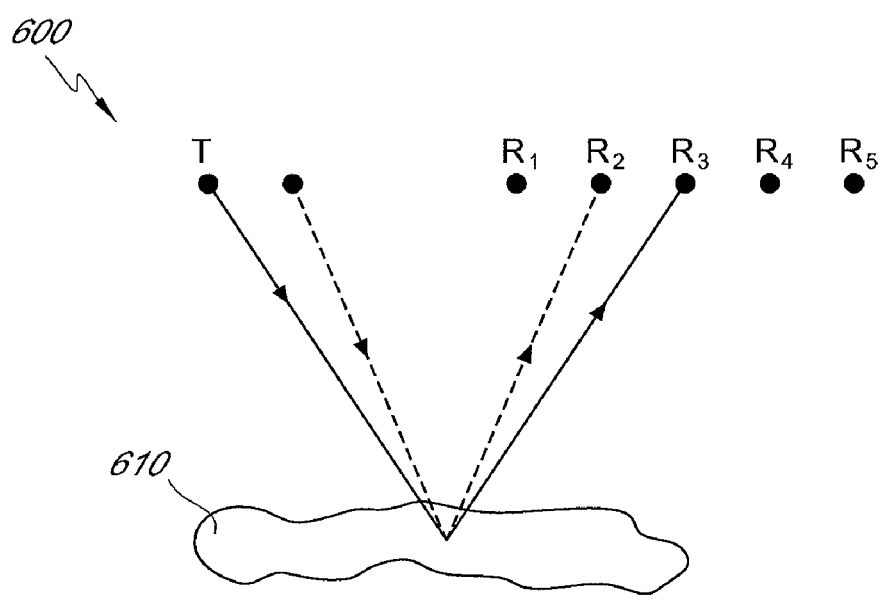
FIG. 6B is a diagram of the system of FIG. 6A, after the system has moved.

Still other embodiments have only one transmitter which is used at different times so as to produce different signals which are correlated to find a travel time difference. FIGS. 6A and 6B are diagrams of a system of multiple transducers in motion for measuring the sound speed to a particular depth. FIG. 6A illustrates the system at an initial position. The system 600 comprises a transmitter (T) and an array of receivers. The transmitter (T) transmits a first pulse which is reflected by an acoustically reflective surface 610 and received by one of the receivers, in the illustrated case, receiver $R_1$. The system 600 can be attached to the hull of a vessel which moves after the transmission and reception of the first pulse.

FIG. 6B is a diagram of the system of FIG. 6A, after the system has moved to a subsequent position. At this point, the transmitter (T) transmits a second pulse, which is again reflected by the acoustically reflective surface 610 and received by one of the receivers, in the illustrated case, receiver $R_3$. As shown in FIG. 6B, the path length of the first path, shown as a dashed line, between where the transmitter was, the reflective surface 610, and array, is different from the length of the second path, shown as a solid line, between where the transmitter is, the reflective surface 610, and array. The two received waveforms can be cross-correlated to generate an estimate in travel time difference between the two paths. The travel time can be estimated in a number of ways, as discussed above. From these measurements, the sound speed between the transducers and the reflective surface, as well as the depth between the transducers and the reflective surface can be estimated.

Motion of the platform (e.g., a ship) to which the transducers are attached, including horizontal and vertical velocity and pitch rate, can affect the transducer positions at the times of signal transmission and reception in a reference frame fixed to the water, and thus affect travel time measurements. Biases can be removed by direct measurement of platform motion by inertial, acoustic, satellite, or other methods, or some combination of these, and then correcting the travel times by the modeled error attributable to this motion. Besides travel time errors, platform motion can also cause the effective water-relative transducer geometry to stray from the ideal arrangement conforming to the bistatic invariance principle, leading to decorrelation effects. One method of adjusting horizontally for non-ideal effective geometry given a fixed platform-relative transducer geometry is to introduce a delay between transmissions from the transmitting transducers, which changes the effective water-relative transducer separation of transmitters and receivers in opposite directions, each by a distance equal to the product of the delay interval and the platform velocity. This approach may only be practical for the predictable portion of platform motion. Another approach applicable to a receiver array is to vary the weighting of the array elements to adjust the geometrical position of the effective center. This latter method is not restricted to adjusting for only the predictable portion of platform motion, since it can be applied after the signals are received and the motion has been measured. Another approach, applicable if the transmit beam is wide enough in the fore-aft direction to allow it, is to adopt the asymmetric geometry of FIG. 2B or FIG. 3B for which the bistatic invariance condition holds for the existing effective (i.e., motion-corrected) transducer separations.

As noted above, pitch and roll of a moving platform, such as a ship, to which the transducers are attached, can negatively affect performance. In one embodiment, a Mills cross geometry is used to mitigate this issue. Thus, in one embodiment, the transmit beam is wider than the receive beam in the fore-aft direction, and narrower athwartships, by factors large enough that the beams intersect at reasonably stable sea states. In another embodiment, the receive array staves are split laterally into two or more smaller elements, each with small phase differences introduced to steer the receive beam laterally so as to track the transmit beam during roll.

Although the transducers are collinear in the embodiments described above, this is not a necessary condition. The transducers may be located such that not only are the two ellipsoids matched in slope at the center of the beam, but also in curvature. Such a configuration, and as mentioned any configuration described above, may also be simulated using a receive array with signal processing that implements a time delay that can vary as a function of the angle of arrival of an acoustic ray.

Figure 7:
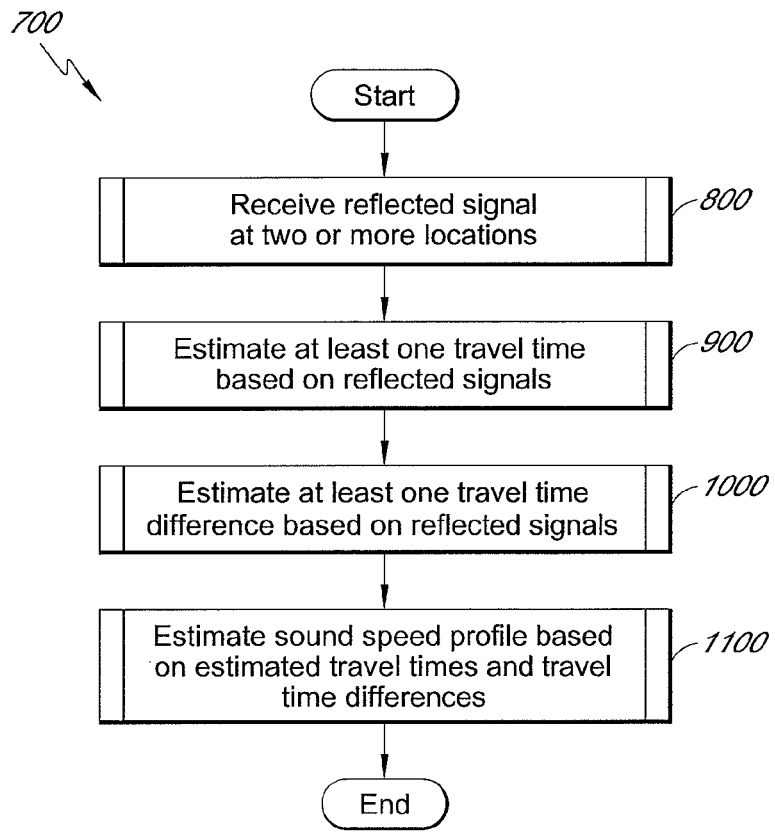
FIG. 7 is a flowchart illustrating a method of estimating a sound speed profile, according to one embodiment.

FIG. 7 is a flowchart illustrating a method of estimating a sound speed profile, according to one embodiment. The process 700 begins, in block 800, with the system's reception of a reflected signal at two or more locations. The reception may be performed by, e.g., the transducers 160 of FIG. 1B. As described above, the reflected signals may be received by different hydrophones, either simultaneously or in quick succession, or the reflected signals may be received by the same hydrophone first receiving at a first location, moving to a second location, and then receiving at the second location. For example, the hydrophone may be moving, e.g., attached to the hull of a moving vessel.

Figure 8:
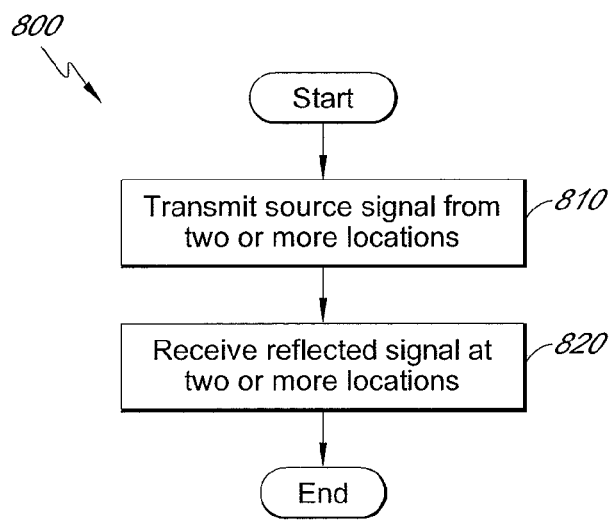
FIG. 8 is a flowchart illustrating a method of receiving a reflected signal.

FIG. 8 is a flowchart illustrating a method of receiving a reflected signal according to one embodiment of the invention. The process 800 begins, in block 810, with the system transmitting a source signal from two or more locations. The source signal can be anything producible by the system, e.g., by the transducers 160 of FIG. 1B. For example, the source signal can be a pulse or a chirp. The source signal can be a bit sequence or pseudorandom, resembling thermal noise.

As described above, with respect to FIG. 3, for example, the source signal can be transmitted from two different transducers. In one embodiment, two different and physically separated transducers emit two different source signals. For example, the two different source signals can be digitally encoded with different pseudorandom codes. The different source signals can be specially selected orthogonal bit sequences, such as Walsh codes. The different source signals can be nearly orthogonal pseudorandom sequences which resemble white noise. The different source signals can be an upward chirp and a downward chirp. In general, the different source signals can be, but needn't be, orthogonal or nearly orthogonal. The different source signals can be transmitted simultaneously or such that portions of their transmission overlap. In another embodiment, two different and physically separated transducers emit the same source signal. The source signal can be transmitted simultaneously from both transducers. The source signal can be transmitted for each transducer at different times. In some embodiments, source signals are transmitted from more than two locations. Exemplary geometries are shown in FIGS. 4 and 5. These source signals can also be the same or dissimilar. These source signals can also be transmitted simultaneously, overlapping, or at different times, with alternating or sequential pulses.

After transmission in block 810, the system receives reflected signals at two or more locations in block 820. The signals can be reflected (or refracted) by a number of physical phenomena, including but not limited isolated targets, distributed particles, or sound speed inhomogeneities. The reflection can be due to a life layer, such as a layer of plankton or schooling fish, an underwater vehicle, such as submarine or AUV (autonomous underwater vehicle), or a reflective plates or buoys dangled from the vessel 102 for the purposes of acoustic sound speed measurement. The reflection can also be caused by sound speed differences, such as a sound speed gradients strong enough to scatter sound. For example, the reflection can be due to a thermocline.

Sharing the expansive nature of transmission, reception can also be performed in a number of ways. For example, reception can be performed by two different and physically separate transducers, such as is shown in FIG. 3. Reception can be performed by a single transducer at different times. The receivers can be distinct from the transmitters, such as is shown in FIG. 3. At least one of the receivers can also be a transmitter, such as is shown in FIG. 2 or 4. Receiving a reflected signal can also include preliminary processing of the signal. For example, the reflected signal can be filtered within the transmission bandwidth. The reflected signal can undergo an analog-to-digital conversion.

Referring again to FIG. 7, after reflected signals are received, in block 800, the system estimates at least one travel time based on the reflected signals, in block 900. The estimate of travel time can be an estimation, calculation, determination, or approximation of the time taken by a hypothetical or real sound wave to travel between a transducer, a reflector, and the transducer (or a second transducer). The estimate can be determined, e.g., by the processor 152 of FIG. 1B.

Figure 9:
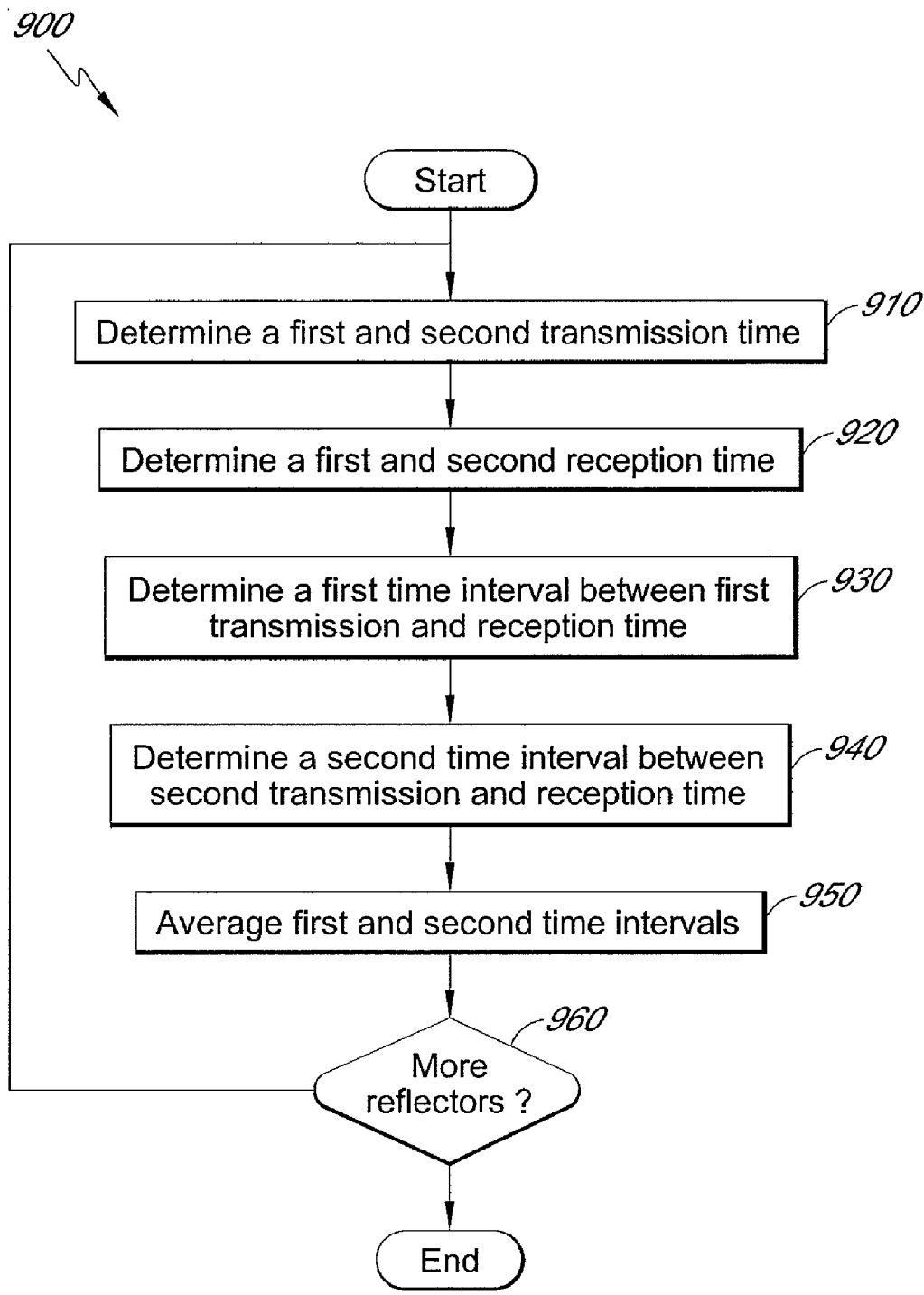
FIG. 9 is a flowchart illustrating a method of estimating a travel time.

In one embodiment, once a signal is transmitted, a timer is started. When a reflected signal is first received, the timer is latched and its value stored, with the resulting time being an estimate of the travel time based on the reflected signals. Another embodiment of a method of estimating a travel time is described with respect to FIG. 9. The process 900 begins, in block 910, with the determination by the system of a first and second transmission time. As described with respect to FIG. 8, the first and second transmission time can be the same. In one embodiment, when transmission begins, the time (e.g., based on a Global Positioning System (GPS) receiver), is noted or stored in a computer memory. In another embodiment, transmission and reception are performed concurrently, and the received signal comprises a measurement of both the source signals and the reflected signals. In this way, a first and second transmission time can be determined from the received signals.

Next, in block 920, the system determines first and second reception times. In one embodiment, the received signal is correlated with the transmitted signal. As is known in the art, this results in a peak where (or when) the received signal is mathematically similar to the transmitted signal. The first reception time can, for example, be determined by correlating the received signal from the first receiver with the transmitted signal from the first transmitter. Any peak-finding algorithm, ranging from the simple (e.g., taking the maximum of the correlated signal) to the more complex (e.g., demodulation, filtering, and interpolating the cross-correlation phase to the peak), can be used to determine a reception time. In one embodiment, the first reception time corresponds to a reception time determined using the first receiver ($R_1$) and the second reception time corresponds to a reception time determined using the second receiver ($R_2$).

The system uses the transmission times and reception times, in block 930 and 940, to determine first and second time intervals. The first and second time intervals can be derived from the transmission times and reception times in a number of ways. In one embodiment, the first time interval is the difference of the first reception time and the first transmission time. In one embodiment, the first time interval is half of the difference of the first reception time and first transmission time. The second time interval can be determined similarly, or with a different method.

The system uses the time intervals, in block 950, to determine an estimate of travel time by averaging the first and second time intervals. In other embodiments, the estimate of travel time is simply one or the other of the first or second time interval. The averaging described with reference to block 950 can be performed with equal weighting, e.g., one half the first time interval plus one half the second time interval, or with unequal weighting. The weighting can be based, e.g., on a signal-to-noise ratio of the received signal.

In block 960, the system determines whether or not there are more reflectors. If there is only one acoustically reflective surface in the water column, the process 900 ends; however, if there are more reflective surfaces, and therefore, more reception times to determine, the process 900 returns to block 910 and repeats.

Referring again to FIG. 7, after reflected signals are received, in block 800, (and either before, after, or while a travel time is estimated in block 900) the system estimates at least one travel time difference based on the reflected signals, in block 1000. The estimate of travel time difference can be, in general, an estimation of the difference in time taken to travel a first path between a first transmitter, a reflector, and a first receiver and a second path between a second transmitter, the reflector, and a second receiver. As noted above, the first and second transmitter and/or first and second receiver can be the same physical device at one or more different locations. The estimate can be determined, e.g., by the processor 152 of FIG. 1B. In one embodiment, when a reflected signal is first received, a timer is started, and when a second reflected signal is received, the timer is stopped, with the resulting time being an estimate of the travel time difference based on the reflected signals.

Figure 10:
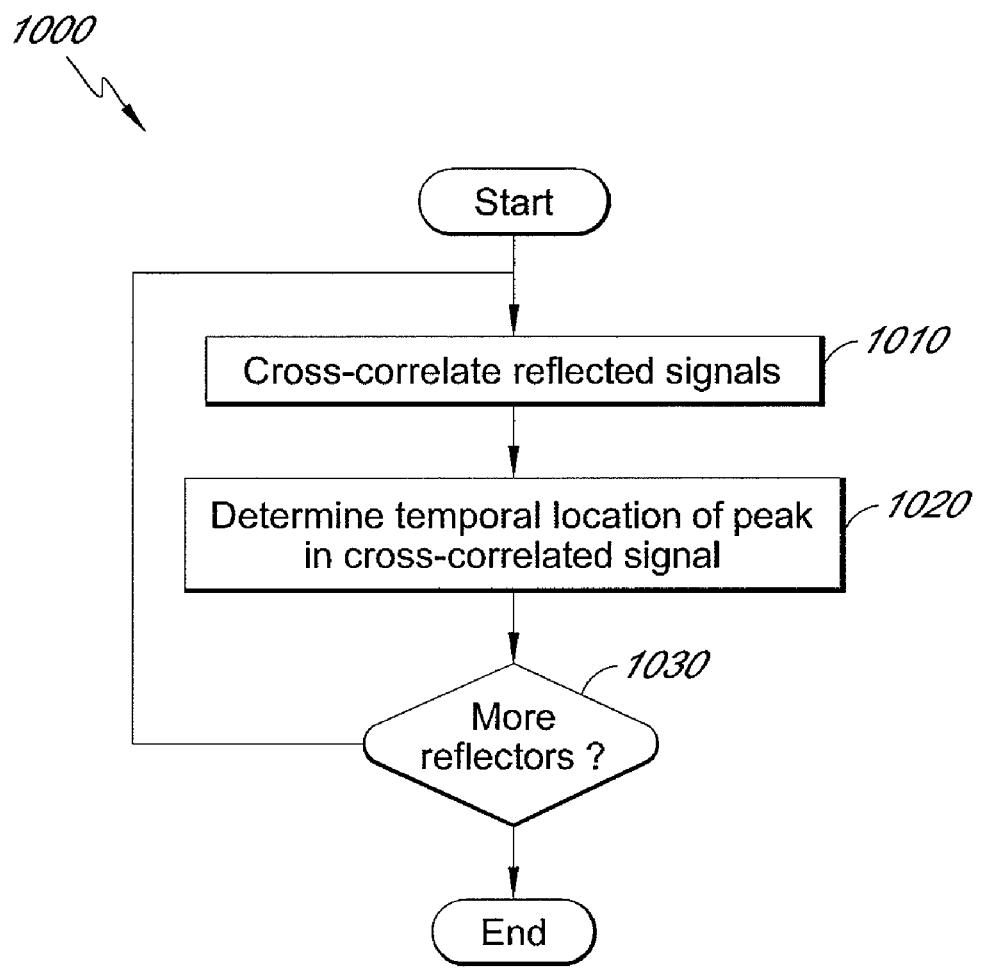
FIG. 10 is a flowchart illustrating a method of estimating a travel time difference.

FIG. 10 is a flowchart illustrating another embodiment of a method of estimating a travel time difference. The process begins, in block 1010, with the system cross-correlating the reflected signals. In an embodiment with only two receivers, the cross-correlation can be a correlation of the first reflected signal and the second reflected signal. As discussed above, correlation results in a peak where the two signals are similar, at a time lag corresponding to the time difference between respective receptions of the two similar signals. In block 1020, the system determines the temporal location of the peak in the cross-correlated signal. As discussed above, any peak-finding algorithm can be used in this task. Next, in block 1030, the system determines whether or not there are more reflectors. If there is only one acoustically reflective surface in the water column, the process 1000 ends; however, if there are more reflective surfaces, and therefore, more reception times to determine, the process 1000 returns to block 910 (or block 920 to avoid repetition of the same processing) and repeats.

In other embodiments involving more than one receiver, more complicated cross-correlation procedure may be necessary. In one embodiment, with three receivers, such as that shown in FIG. 5, the first reflected signal is cross-correlated with the second reflected signal and the third reflected signal is also cross-correlated with the second reflected signal.

Referring, once again, to FIG. 7, after the system estimates the travel time and travel time difference, the process 700 finishes in block 1100 with an estimation of a sound speed profile. A sound speed profile is, in general, a correspondence between depth and sound speed. This correspondence can be plotted or stored in a data structure of a computer memory. In its simplest form, a sound speed profile can be a single depth and the speed of sound between the surface and that depth. In other forms, a sound speed profile includes many depths and the speed of sound between those many depths. In other forms, a sound speed profile is a function of depth resulting in a speed for each depth.

Figure 11:
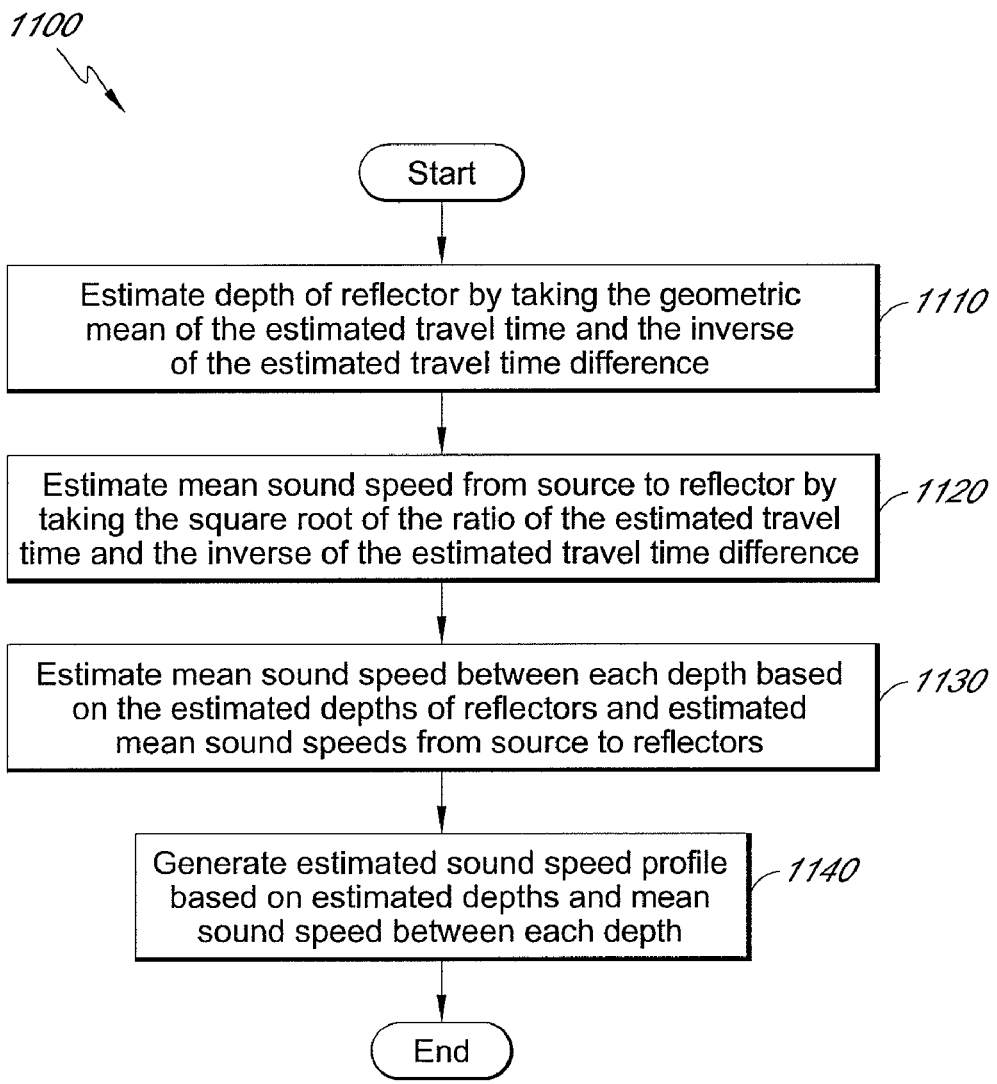
FIG. 11 is a flowchart illustrating a method of estimating a sound speed profile, according to another embodiment.

Methods of estimating a sound speed or a sound speed profile based on travel time and travel time difference have been described in detail above, e.g., with reference to Equations 5 and 7. FIG. 11 is a flowchart illustrating a method 1100 of estimating a sound speed profile, according to another embodiment. The process 1100 begins, in block 1110, with the system estimating a depth of a reflector. In one embodiment, the depth from the source to the reflector is determined by taking the geometric mean of the estimated travel time and the inverse of estimated travel time difference.

Further processing may be necessary to estimate the depth from the geometric mean. For example, as shown in Equation 5, multiplication by a constant (based on the geometry of the transducers) is necessary. In other embodiments, other arithmetic (addition, subtraction, multiplication, division, square root, logarithms, etc.) may be necessary. In block 1120, the system finds an estimated mean sound speed by taking the square root of the ratio of the estimated travel time difference and the estimated travel time. Again, as in block 1110, and as shown in Equation 7, further processing may be necessary to estimate the mean sound speed between the source and the reflector.

After the operations in blocks 1110 and 1120 have been performed for one or more depths, the mean sound speed between each depth is determined based on the estimated depths and means sound speeds to those depths. One embodiment is described above with respect to Equation 10. Finally, in block 1140, the system generates an estimated sound speed profile based on the estimated depths and the mean sound speed between each depth. As mentioned above, the estimated sound speed may be plotted, transmitted, or stored on a computer-readable medium.

The sound speed profile can be used in a number of different contexts. The sound speed profile, for example, is of particular utility in naval operations, in which it can be used to determine how sound will propagate, or to determine "shadow zones" in which SONAR is unable to detect submarines. The sound speed profile can be further processed to determine a number of physical parameters, including temperature, salinity, conductivity, density. This information can be of use to, e.g., climatographers and oceanographers.

While the specification describes particular examples of the present invention, those of ordinary skill can devise variations of the present invention without departing from the inventive concept. Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of estimating a sound speed, the method comprising:
    transmitting a first acoustic signal through a water column from a first location;
    transmitting a second acoustic signal at a second location;
    receiving a first scattered signal at a third location, the first scattered signal comprising a plurality of echoes of the first acoustic signal reflected by a scattering layer within the water column;
    receiving a second scattered signal at a fourth location, the second scattered signal comprising a plurality of echoes of the second acoustic signal reflected by the scattering layer;
    estimating a travel time based on at least one of the echoes of the first acoustic signal reflected by the scattering layer or the echoes of the second acoustic signal reflected by the scattering layer;
    generating a cross-correlation signal comprising the cross-correlation of at least one of the echoes of the first scattered signal and at least one of the echoes of the second scattered signal in accordance with the bistatic invariance principle;
    estimating a travel time difference based on at least the cross-correlation signal; and
    estimating a sound speed based on the estimated travel time and the estimated travel time difference.

2. The method of claim 1, wherein at least two of the first, second, third, and fourth location are the same location.

3. The method of claim 1, wherein estimating a sound speed comprises determining the square root of the inverse of the quantity consisting of the estimated travel time multiplied by the estimated travel time difference.

4. The method of claim 1, further comprising estimating a depth associated with the sound speed.

5. The method of claim 4, wherein estimating a depth comprises multiplying the estimated sound speed by half the actual or inferred vertical travel time.

6. The method of claim 4, further comprising estimating a sound speed profile based on the estimated sound speed and estimated depth.

7. The method of claim 6, wherein the estimated sound speed profile is based on a plurality of estimated sound speeds, and a respective plurality of estimated depths.

8. The method of claim 1, wherein at least one of transmitting a first acoustic signal transmitting, receiving a second acoustic signal, receiving a third acoustic signal, or receiving a fourth acoustic signal comprises using an array.

9. The method of claim 4, wherein the phase relationship of the scattering layer at the depth is approximately the same for the paths between the first location, the scattering layer, and the third location and between the second location, the scattering layer, and the fourth location.

10. The method of claim 1, wherein estimating a travel time comprises:
    determining a time interval between i) a first time when at least one of the first or second acoustic signal is transmitted and ii) a second time when at least one of the first or second scattered signal is received.

11. The method of claim 1, wherein estimating a travel time comprises:
    determining a first time interval between i) a first time when the first acoustic signal is transmitted and ii) a second time when the first scattered signal is received;
    determining a second time interval between i) a third time when the second acoustic signal is transmitted and ii) a fourth time when the second scattered signal is received; and
    averaging the first and second time intervals to generate an estimate of travel time.

12. The method of claim 11, wherein at least two of the first, second, third, and fourth time are the same time.

13. The method of claim 1, wherein the cross-correlation is 50% or less.

14. The method of claim 1, wherein estimating a travel time difference further comprises determining the temporal location of a peak in the cross-correlation signal.

15. The method of claim 1, wherein transmitting the first acoustic signal and transmitting the second acoustic signal comprises transmitting the first acoustic signal from a transmitter at a first location at a first time and transmitting a second acoustic signal from the transmitter at a second location different from the first location at a second time different from the first time.

16. The method of claim 1, wherein the first and second acoustic signals are different.

17. The method of claim 16, wherein the first acoustic signal is orthogonal or nearly orthogonal to the second acoustic signal.

18. The method of claim 16, wherein the first and second acoustic signals are encoded with an upward chirp and a downward chirp.

19. The method of claim 1, wherein the first acoustic signal is transmitted by a first transmitter, and wherein the second acoustic signal is transmitted by a second transmitter that is separate from the first transmitter.

20. The method of claim 1, wherein estimating the travel time is based on at least one of the first or second scattered signals.

21. A system for estimating a sound speed, the system comprising:
a plurality of transducers configured to i) transmit a first acoustic signal from a first location, ii) transmit a second acoustic signal at a second location, iii) receive a first scattered signal at a third location, and iv) receive a second scattered signal at a fourth location, the first scattered signal comprising a plurality of echoes from the first acoustic signal reflected by a scattering layer, and the second scattered signal comprising a plurality of echoes from the second scattered signal reflected by the scattering layer; and
a microprocessor configured to i) estimate a travel time based on at least one of the echoes of the first acoustic signal reflected by the scattering layer or the echoes of the second acoustic signal reflected by the scattering layer, ii) generate a cross-correlation signal in accordance with the bistatic invariance principle, the cross-correlation signal comprising a cross-correlation of the first scattered signal and the second scattered signal, iii) estimate a travel time difference based on the cross-correlation signal, and iv) estimate a sound speed based on at least the estimated travel time and estimated travel time difference.

22. The system of claim 21, wherein the plurality of transducers comprise at least a first transducer configured to transmit the first acoustic signal and a second transducer configured to transmit the second acoustic signal, and wherein the first transducer is spaced apart from the second transducer.

23. The system of claim 21, wherein at least two of the first, second, third, and fourth locations are the same location.

24. The system of claim 21, wherein the plurality of transducers are arranged in an array.

25. The system of claim 21, wherein the microprocessor is further configured to estimate a depth associated with the sound speed.

26. The system of claim 21, wherein the microprocessor is further configured to estimate a sound speed profile based on a plurality of estimated sound speeds and a respective plurality of estimated depths.

27. The system of claim 21, wherein the microprocessor is configured to estimate the depth based on the phase relationship of the scattering layer at the depth being approximately the same for the paths between the first location, the scattering layer, and the third location and between the second location, the scattering layer, and the fourth location.

28. The system of claim 21, wherein the microprocessor is configured to estimate a travel time by determining a time interval between i) a first time when at least one of the first or second acoustic signal is transmitted and ii) a second time when at least one of the first or second scattered signal is received.

29. The system of claim 21, wherein the microprocessor is configured to estimate a travel time by:
determining a first time interval between i) a first time when the first acoustic signal is transmitted and ii) a second time when the first scattered signal is received;
determining a second time interval between i) a third time when the second acoustic signal is transmitted and ii) a fourth time when the second scattered signal is received; and
averaging the first and second time intervals to generate an estimate of travel time.

30. The system of claim 29, wherein at least two of the first, second, third, and fourth time are the same time.

31. The system of claim 21, wherein the cross-correlation is 50% or less.

32. The system of claim 21, wherein the microprocessor is configured to estimate the travel time based on determining the temporal location of a peak in the cross-correlation signal.

33. The system of claim 21, wherein the plurality of transducers are configured to transmit the first acoustic signal from a transmitter at a first location at a first time and transmit a second acoustic signal from the transmitter at a second location different from the first location at a second time different from the first time.

34. The system of claim 21, wherein the plurality of transducers are configured to transmit the first acoustic signal and the second acoustic signal such that the transmitted signals have different properties.

35. The system of claim 34, wherein the plurality of transducers are configured to transmit the second acoustic signal such that it is orthogonal or nearly orthogonal to the first acoustic signal.

36. The system of claim 34, wherein the system is further configured to encode the first and second acoustic signals with an upward chirp and a downward chirp.

37. A system for estimating a sound speed, the system comprising:
means for transmitting a first acoustic signal from a first location;
means for transmitting a second acoustic signal at a second location;
means for receiving a first scattered signal at a third location, the first scattered signal comprising a plurality of echoes of the first acoustic signal reflected by a scattering layer;
means for receiving a second scattered signal at a fourth location, the second scattered signal comprising a plurality of echoes of the second acoustic signal reflected by the scattering layer;
means for estimating a travel time based on at least one of the first or second reflected signals;
means for generating a cross-correlation signal comprising a cross-correlation of a first echo of the first scattered signal and a second echo of the second scattered signal, the first echo having a first angle bisector with the first acoustic signal, the second echo having a second angle bisector with the second acoustic signal, the first angle bisector being substantially equal to the second angle bisector;

means for estimating a travel time difference based on at least the cross-correlation signal; and means for estimating a sound speed based on the estimated travel time and the estimated travel time difference.

38. A non-transitory computer-readable storage medium having instructions encoded thereon which, when executed by a processor, causes a computer to perform a method of estimating a sound speed, the method comprising:

transmitting a first acoustic signal from a first transmitter at a first location;

transmitting a second acoustic signal from a second transmitter at a second location different from the first location, the second transmitter separated from the first transmitter;

receiving a first scattered signal at a third location, the first scattered signal comprising a plurality of echoes of at least one of the acoustic signals reflected by a scattering layer;

receiving a second scattered signal at a fourth location, the second scattered signal comprising a plurality of echoes of at least one of the acoustic signals reflected by the scattering layer;

estimating a travel time based on at least one of the first or second scattered signals;

generating a cross-correlation signal comprising the cross-correlation of at least one of the echoes of the first scattered signal and at least one of the echoes of the second scattered signal having an approximate bistatic geometry sharing substantially the same angle bisector between respective transmitted acoustic signals and scattered echoes;

estimating a travel time difference based on at least the cross-correlation signal;

estimating a sound speed based on the estimated travel time and the estimated travel time difference.

* * * * *